US010343239B2

(12) United States Patent
Lee et al.

(10) Patent No.: US 10,343,239 B2
(45) Date of Patent: Jul. 9, 2019

(54) APPARATUS AND METHOD FOR MANUFACTURING HEAT EXCHANGER

(71) Applicant: SAMSUNG ELECTRONICS CO., LTD., Suwon-si, Gyeonggi-do (KR)

(72) Inventors: Doo-hee Lee, Gwangju (KR); Hyoung-hoon Roh, Gwangju (KR); Bum-jung Lee, Gwangju (KR); Hyoung-sub Han, Gwangju (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 132 days.

(21) Appl. No.: 15/343,741

(22) Filed: Nov. 4, 2016

(65) Prior Publication Data

US 2017/0144261 A1 May 25, 2017

(30) Foreign Application Priority Data

Nov. 20, 2015 (KR) ........................ 10-2015-0163257

(51) Int. Cl.
*B23P 15/00* (2006.01)
*B23P 15/26* (2006.01)
(Continued)

(52) U.S. Cl.
CPC ............ *B23P 15/26* (2013.01); *B21D 53/022* (2013.01); *B21D 53/06* (2013.01); *B21D 53/085* (2013.01);
(Continued)

(58) Field of Classification Search
CPC ....... B23P 15/26; B21D 53/022; B21D 53/06; B21D 53/085; B21D 43/145; F28F 2215/12; F28F 1/32; F28D 1/05366
See application file for complete search history.

(56) References Cited

U.S. PATENT DOCUMENTS 3,868,758 A 3/1975 Wightman et al.
4,407,064 A 10/1983 Denner et al.
(Continued)

FOREIGN PATENT DOCUMENTS

CN 101386050 3/2009
CN 201799530 4/2011
(Continued)

OTHER PUBLICATIONS

Chinese Office Action dated Feb. 24, 2018 in Chinese Patent Application No. 201611048960.0.
(Continued)

*Primary Examiner* — Rick K Chang
(74) *Attorney, Agent, or Firm* — Staas & Halsey LLP

(57) ABSTRACT

A heat exchanger may be manufactured using an apparatus which includes a rotating body configured to be disposed at one side of heat exchange fins having an insertion groove having one side formed to be depressed and placed to be downwardly directed to be rotatable. An inner side of the insertion groove of transferred heat exchange fins are seated on the rotating body. The apparatus also include a rotating blade configured to be connected to the rotating body to be rotatable together with the rotating body. The rotating blade supports the other side of the heat exchange fins to prevent the heat exchange fins from being deviated from the rotating body.

13 Claims, 14 Drawing Sheets

(51) Int. Cl.

| | |
|---|---|
| ***B21D 53/02*** | (2006.01) |
| ***B21D 53/06*** | (2006.01) |
| ***B21D 53/08*** | (2006.01) |
| *B21D 43/14* | (2006.01) |
| *F28D 1/053* | (2006.01) |
| *F28F 1/32* | (2006.01) |

(52) U.S. Cl.

CPC ............ *B23P 15/00* (2013.01); *B21D 43/145* (2013.01); *F28D 1/05366* (2013.01); *F28F 1/32* (2013.01); *F28F 2215/12* (2013.01)

(56) References Cited

U.S. PATENT DOCUMENTS

| | | | |
|---|---|---|---|
| 5,937,935 | A | 8/1999 | Schornhorst et al. |
| 6,067,704 | A | 5/2000 | Warren et al. |
| 6,269,541 | B1 | 8/2001 | Iguchi et al. |
| 6,332,266 | B1 | 12/2001 | Park et al. |
| 9,551,539 | B2 * | 1/2017 | Lee .......................... F28F 1/12 |
| 9,616,530 | B2 | 4/2017 | Kondou et al. |
| 9,816,761 | B2 | 11/2017 | Suzuki et al. |
| 2002/0104215 | A1 | 8/2002 | Tokunaga et al. |
| 2014/0374077 | A1 | 12/2014 | Lee et al. |
| 2015/0114613 | A1 | 4/2015 | Suzuki et al. |
| 2015/0367461 | A1 | 12/2015 | Kondou et al. |
| 2016/0082555 | A1 | 3/2016 | Nishimura et al. |

FOREIGN PATENT DOCUMENTS

| | | |
|---|---|---|
| CN | 202779492 | 3/2013 |
| CN | 104236366 | 12/2014 |
| CN | 104334996 | 2/2015 |
| CN | 104936720 | 9/2015 |
| JP | 11-148793 | 6/1999 |
| JP | 11-309564 | 11/1999 |
| JP | 2000-176754 | 6/2000 |
| JP | 3300609 | 4/2002 |
| JP | 3489774 | 11/2003 |
| JP | 2006-110694 | 4/2006 |
| JP | 4219258 | 11/2008 |
| JP | 2013/125625 | 8/2013 |
| JP | 2014-149096 | 8/2014 |
| KR | 20-0382187 | 4/2005 |
| KR | 10-2005-0050177 | 5/2005 |
| KR | 10-0932640 | 12/2009 |
| KR | 10-1015400 | 2/2011 |
| KR | 10-1291026 | 8/2013 |
| KR | 10-2014-0147408 | 12/2014 |
| WO | 2014/192771 | 12/2014 |

OTHER PUBLICATIONS

European Search Report dated May 9, 2017 from European Patent Application No. 16199673.1, 10 pages.

* cited by examiner 100
220
200
201
10
300
360
230
10
20
400
410

APPARATUS AND METHOD FOR MANUFACTURING HEAT EXCHANGER

CROSS-REFERENCE TO RELATED APPLICATIONS

This application claims priority from Korean Patent Application No. 10-2015-0163257, filed on Nov. 20, 2015, in the Korean Intellectual Property Office, the disclosure of which is incorporated herein by reference in its entirety.

BACKGROUND

1. Field

Apparatuses and methods disclosed herein relate to an apparatus and method for manufacturing a heat exchanger, and more particularly, to an apparatus and method for manufacturing a heat exchanger capable of continuously mass-producing the heat exchanger and providing the heat exchanger having excellent quality.

2. Description of the Related Art

An air conditioner refers to an apparatus that pleasantly maintains indoor air to be suitable for activity of human using a refrigeration cycle. The air conditioner may cool an indoor by a repeat operation of inhaling hot air of the indoor to perform a heat exchange for the inhaled hot air with a low temperature refrigerant and then discharging the heat-exchanged air to the indoor, or may heat the indoor by an opposite operation.

The air conditioner may cool or heat the indoor by the refrigeration cycle of forwardly or backwardly circulating a compressor, a condenser, an expansion valve, and an evaporator. The compressor provides a refrigerant of a gas state of high temperature and high pressure, and the condenser provides a refrigerant of a liquid state of room temperature and high pressure. The expansion value depressurizes the refrigerant of the liquid state of the room temperature and high pressure, and the evaporator vaporizes the depressurized refrigerant into a gas state of low temperature.

The air conditioner may be classified into a separate air conditioner in which an outdoor unit and an indoor unit are installed to be separated from each other, and an integral air conditioner in which the outdoor unit and the indoor unit are installed to be integral. In general, in the case of the separate air conditioner in which the outdoor unit and the indoor unit are installed to be separated from each other, the compressor and the condenser (an outdoor heat exchanger) are included in the outdoor unit, and the evaporator (an indoor heat exchanger) is included in the indoor unit. The refrigerant may circulate and flow in the outdoor unit and the indoor unit through a pipe connecting the outdoor unit and the indoor unit to each other.

The heat exchanger such as the condenser of the outdoor unit or the evaporator of the indoor unit includes a refrigerant pipe in which the refrigerant may flow. The refrigerant pipe has a plurality of fins mounted therein, thereby making it possible to improve heat exchange efficiency. A circular refrigerant pipe was used in a heat exchanger according to the related art, but a plate type of refrigerant pipe capable of reducing resistance applied when external air passes through the heat exchanger may also be recently used. This may be referred to as a plate-fin type of heat exchanger.

The heat exchange efficiency may be improved by mounting the plurality of fins on a plate in which a refrigerant channel is formed. The plate-fin type of heat exchanger according to the related art was manufactured by forming a groove or a hole into which the plate may be inserted in the fin, and inserting the plate into the groove or the hole in a state in which the plurality of fins are stacked. In order to make a contact between the fin and the plate good, a clad was applied before the plate is inserted into the groove or the hole. In this case, there are problems that it is difficult to insert the plate due to friction between the stacked fins and the plate, and the fins are modified or non-uniformly positioned in the case in which the plate is forcedly inserted into the groove or the hole.

SUMMARY

Additional aspects and/or advantages will be set forth in part in the description which follows and, in part, will be apparent from the description, or may be learned by practice of the disclosure.

Exemplary embodiments of the disclosure overcome the above disadvantages and other disadvantages not described above. Also, the disclosure is not required to overcome the disadvantages described above, and an exemplary embodiment of the disclosure may not overcome any of the problems described above.

The disclosure provides an apparatus capable of reversing a machined heat exchange fin.

The disclosure is also to miniaturize a defective rate by pressing a refrigerant tube into the reversed heat exchange fin.

The disclosure is also to assemble a refrigerant tube or a plurality of refrigerant tubes in any pattern.

According to an aspect of the disclosure, an apparatus for manufacturing a heat exchanger may include a rotating body configured to be disposed at one side of heat exchange fins having an insertion groove having one side formed to be depressed and placed to be downwardly directed to be rotatable, and seat an inner side of the insertion groove of transferred heat exchange fins thereon, and a rotating blade configured to be connected to the rotating body to be rotatable together with the rotating body, and support the other side of the heat exchange fins to prevent the heat exchange fins from being deviated from the rotating body.

The rotating body may have a seating surface disposed to be parallel to a transfer direction of the heat exchange fins and having the heat exchange fins placed thereon.

The rotating blade may include: a vertical blade part protruding from an upper portion of the seating surface and disposed at the front portion of the seating surface in relation to the transfer direction of the heat exchange fins, and a horizontal blade part connected to the vertical blade part, and protruding toward a rear portion of the seating surface.

The horizontal blade part may have a supporting surface supporting the other side of the heat exchange fins and disposed to be parallel to the seating surface.

The rotating blade may include a first rotating blade connected to one side of an outer surface of the rotating body, and a second rotating blade connected to the outer surface of the rotating body and disposed at an opposite side of the first rotating blade.

The apparatus may further include a rotating shaft configured to be installed to be inserted into a through-hole formed at the center of the rotating body, wherein the rotating shaft is rotated by 180° at a preset time.

The apparatus may further include a rotating shaft configured to be installed to be inserted into a through-hole formed at the center of the rotating body, wherein a plurality of rotating bodies are disposed at a preset interval along a length direction of the rotating shaft.

The rotating blade may be changeable to: a first position at which the heat exchange fins are placed on the seating surface, and a second position at which the insertion groove is disposed to be upwardly directed by rotating the rotating blade together with the rotating body.

The apparatus may further include a pressing block configured to be disposed at one side of the rotating body and to press a refrigerant tube into the insertion groove in a state in which the heat exchange fins are reversed so that the insertion groove is upwardly directed by a rotation of the rotating body.

The pressing block may be disposed over the heat exchange fins to be elevated toward the heat exchange fins, and a lower end of the refrigerant tube may be sequentially pressed into the insertion groove.

The pressing block may have: a first block part of which a lower end is spaced apart from an upper end of the heat exchange fins, and a second block part connected to one side of the first block part, and having a lower end protruding to be lower than the first block part.

The pressing block may be movable along a length direction of the heat exchange fins, and the refrigerant tube may be pressed in a first pressing state in which the refrigerant tube is pressed into the insertion groove by a falling of the first block part, and a second pressing state in which the refrigerant tube is pressed into the insertion groove by a falling of the second block part.

An interval between a lower end of the first block part and a lower end of the second block part may be 20% to 50% of a height of the refrigerant tube.

According to another aspect of the disclosure, a method for manufacturing a heat exchanger may include a machining operation of machining a metal plate into heat exchange fins having an insertion groove of a plurality of columns, a transferring operation of standing the machined heat exchange fins, and aligning and transferring the heat exchange fins so that the insertion groove is downwardly directed, a reversing operation of reversing the transferred heat exchange fins so that the insertion groove is upwardly directed, and a pressing operation of pressing a refrigerant tube into the reversed heat exchange fins.

In the reversing operation, in a state in which the insertion groove of the heat exchange fins is seated on a seating surface formed on a rotating body and the heat exchange fins are fixed by a rotating blade connected to the rotating body, the heat exchange fins may be reversed by a rotation of the rotating body.

The method may further include, before the pressing operation, aligning a plurality of reversed heat exchange fins.

In the pressing operation, the refrigerant tube disposed over the heat exchange fins may be sequentially pressed into the insertion groove at a preset pitch.

The pressing operation may include: a transferring operation of positioning the refrigerant tube so as to correspond to the insertion groove, a first pressing operation of pressing the refrigerant tube into the insertion groove at a depth of 20% to 50% of the insertion groove, and a second pressing operation of pressing the refrigerant tube into the insertion groove so that a lower end of the refrigerant tube is in contact with a bottom surface of the insertion groove.

BRIEF DESCRIPTION OF THE DRAWINGS

The above and/or other aspects of the disclosure will be more apparent by describing certain exemplary embodiments of the disclosure with reference to the accompanying drawings, in which.

DETAILED DESCRIPTION

Figure 1:
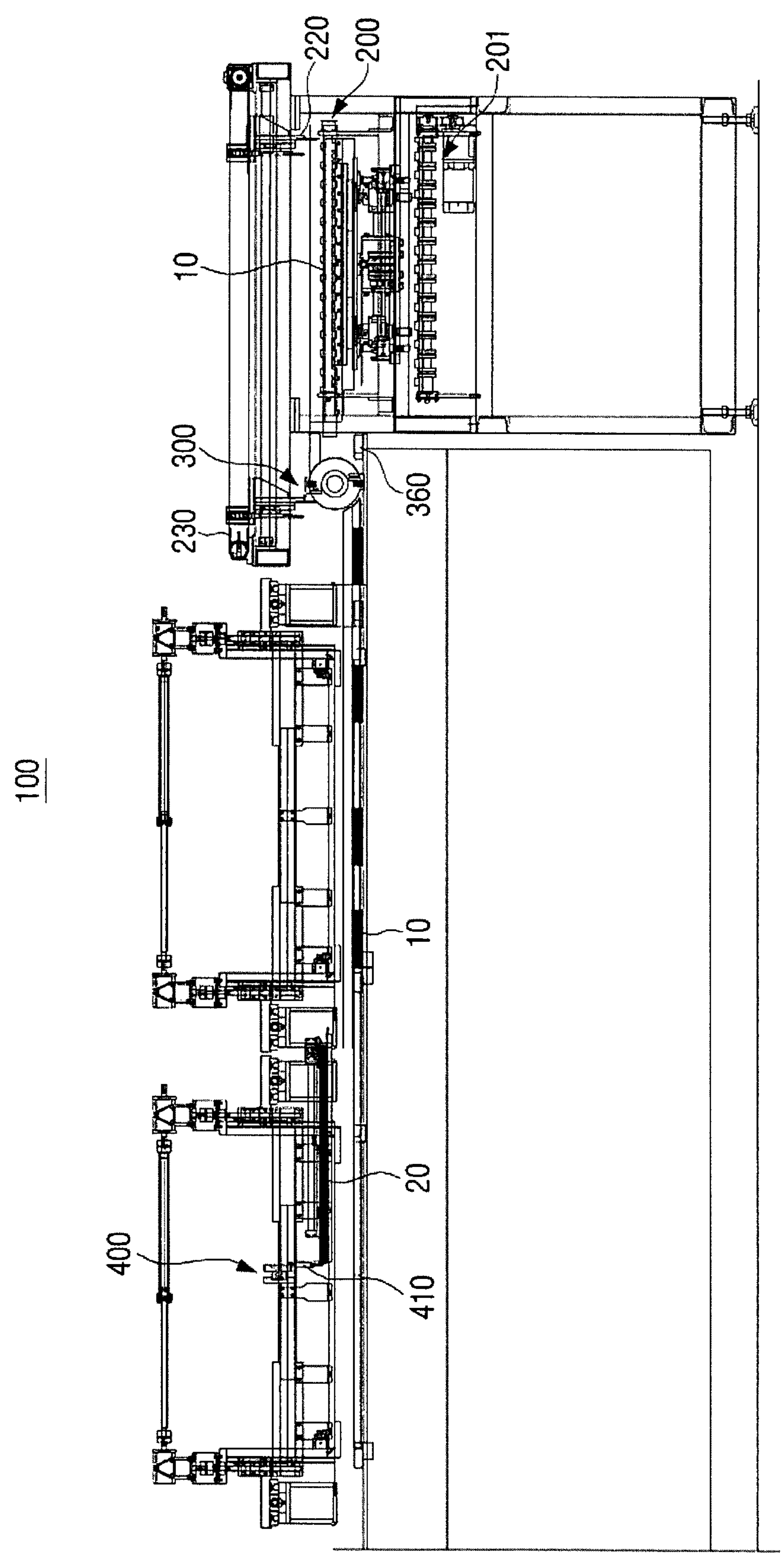
FIG. 1 is a view schematically illustrating an apparatus for manufacturing a heat exchanger according to an exemplary embodiment of the disclosure.

Reference will now be made in detail to example embodiments which are illustrated in the accompanying drawings, wherein like reference numerals refer to like elements throughout. The embodiments are described below to explain the disclosure by referring to the figures.

In order to help understand the disclosure, exemplary embodiments of the disclosure will be described below in more detail with reference to FIGS. 1 to 14. The exemplary embodiments described below will be described based on exemplary embodiments which are most suitable for understanding technical characteristics of the disclosure, and illustrate that the technical characteristics of the disclosure are not limited by the exemplary embodiments described below, but the disclosure may be implemented as in the exemplary embodiments described below.

Therefore, the disclosure may be variously modified within a technical scope of the disclosure through the exemplary embodiments described below, and the modified exemplary embodiments fall within the technical scope of the disclosure. In addition, in order to help understand the exemplary embodiments described below, in regard to reference numerals indicated on the accompanying drawings, the related components of components which perform the same operation in the respective exemplary embodiments are indicated by the same or extension numeral.

Hereinafter, although a description is made based on an example in which heat exchange fins 10 are provided in a form in which they are each inserted into a refrigerant tube, the heat exchange fins 10 are not limited thereto. A fin plate in which the heat exchange fins are formed in one plate form and are folded in a predetermined form to be coupled to the refrigerant tube may be used.

The heat exchange fins 10 according to an exemplary embodiment of the disclosure may be provided by press-machining a metal plate, which is a material of the heat exchange fins 10. A thin metal plate, which is the material of the heat exchange fins 10, may be wound around a roll to be transferred and stored. The metal plate may be manufactured of an aluminum material.

Although not shown, in order to manufacture the heat exchange fins 10, the metal plate wound around the roll may be unwound by an uncoiler in a press-machinable state. The metal plate which is unwound by the uncoiler may be moved to a press-machine to be disposed in the press-machinable state.

The metal plate disposed in the press-machine in the press-machinable state is punched at high speed by the press-machine. The metal plate may be machined to have a shape of the heat exchange fins 10 having an insertion groove into which the refrigerant tube is inserted. The heat exchange fins 10 machined by the press-machine may be arranged in a plurality of columns.

The heat exchange fins 10 punched by the press-machine may be transferred by a transfer apparatus to be moved to an integrating apparatus. The plurality of heat exchange fins machined by the press-machine may be branched into odd-numbered columns and even-numbered columns by the integrating apparatus to be integrated in the integrating apparatus. For example, the heat exchange fins transferred by the transfer apparatus may downwardly fall at a point at which the transfer apparatus is terminated.

Figure 2:
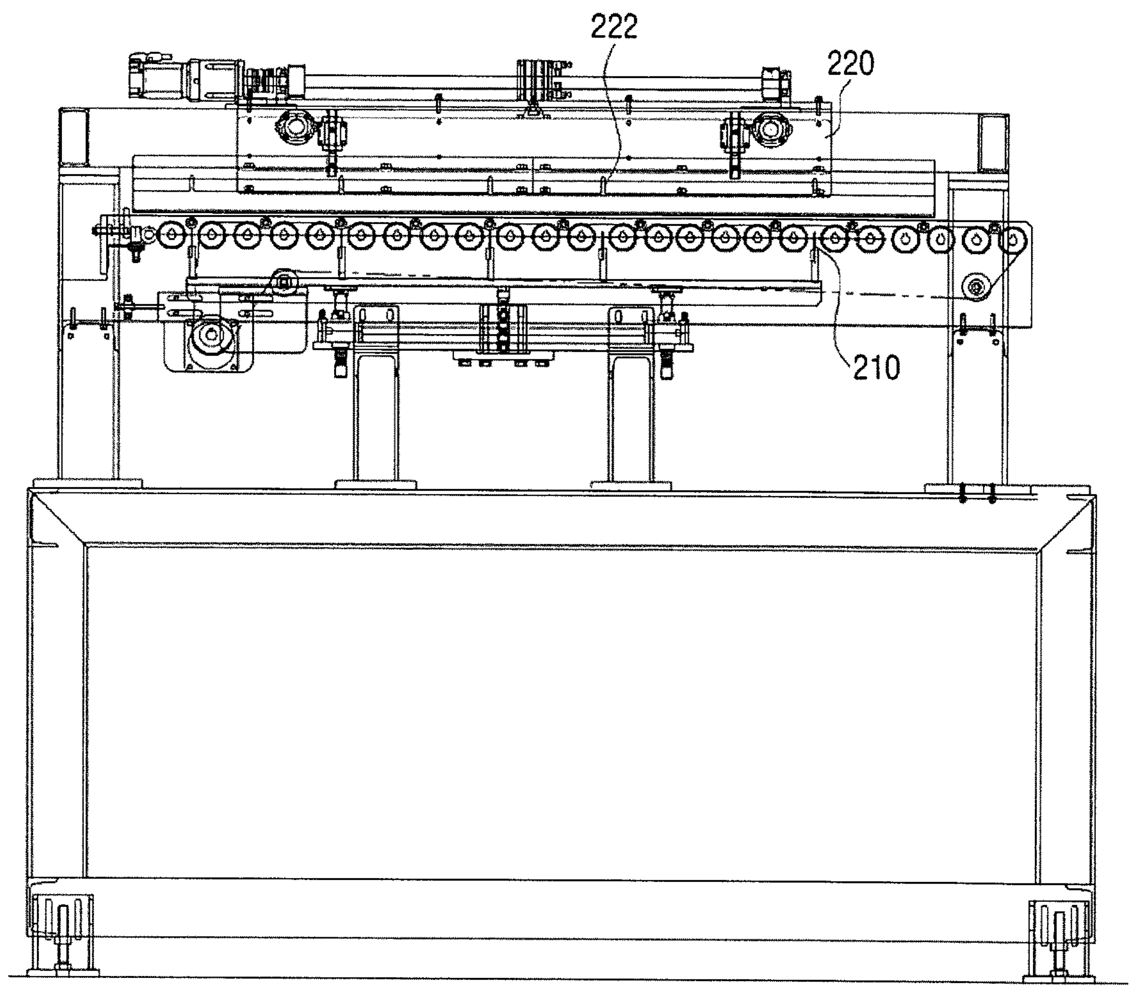
FIG. 2 is a side view of the apparatus for manufacturing a heat exchanger illustrated in FIG. 1.

FIG. 1 is a view schematically illustrating an apparatus 100 for manufacturing a heat exchanger according to an exemplary embodiment of the disclosure and FIG. 2 is a side view of the apparatus for manufacturing a heat exchanger illustrated in FIG. 1. Referring to FIGS. 1 and 2, the heat exchange fins 10 which downwardly fall may be seated on an integrating means 210. The heat exchange fins 10 which are horizontally seated on the transfer apparatus 500 (FIG. 4) to be transferred may be seated on the integrating means 210 in a state in which they vertically stand. The integrating means 210 may be inserted into the insertion groove 11 of the heat exchange fins 10 to transfer the heat exchange fins 10 to a reversing apparatus 300 in a state in which the heat exchange fins 10 stand. The heat exchange fins 10 transferred by the integrating means 210 are reversed by the reversing apparatus 300 so that the insertion groove 11 is upwardly positioned.

The plurality of heat exchange fins 10 may be moved by a collector 220, and may be integrated and aligned so that the heat exchange fins which are adjacent to each other contact with each other. The plurality of heat exchange fins 10 may also be partitioned into the predetermined number which may be pressed into the refrigerant tube 20 at one time by the collector and may be aligned.

The heat exchange fins 10 which are partitioned into the predetermined number and are integrated may be pressed into the refrigerant tube 20 by a pressing apparatus 400. Thereby, the heat exchanger 1 having the heat exchange fins 10 mounted in the refrigerant tube may be manufactured. Hereinafter, a process of manufacturing the heat exchanger 1 will be described in detail.

Figure 3:
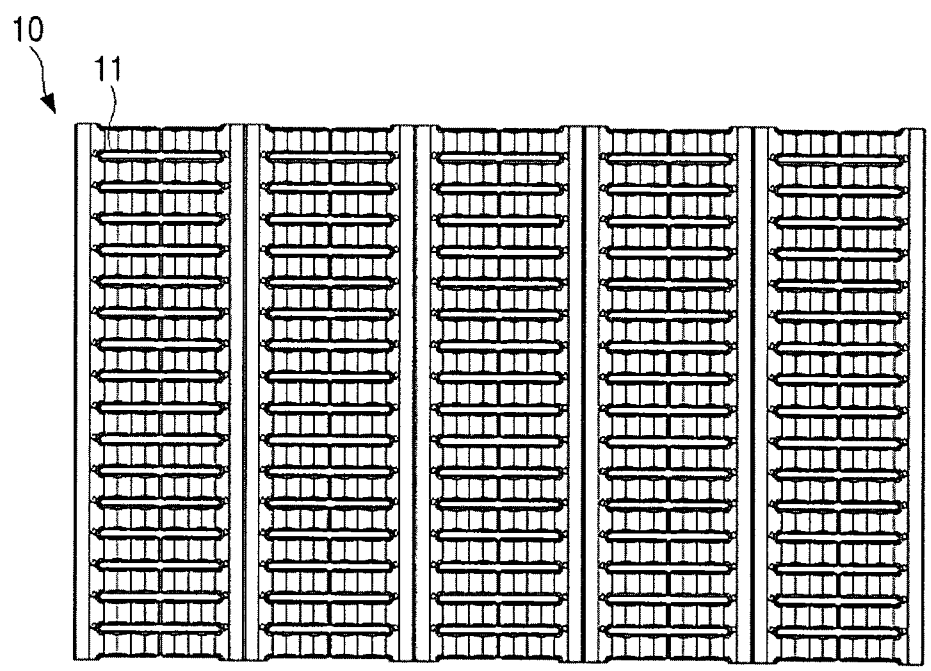
FIG. 3 is a view illustrating heat exchange fins according to an exemplary embodiment of the disclosure.
Figure 4:
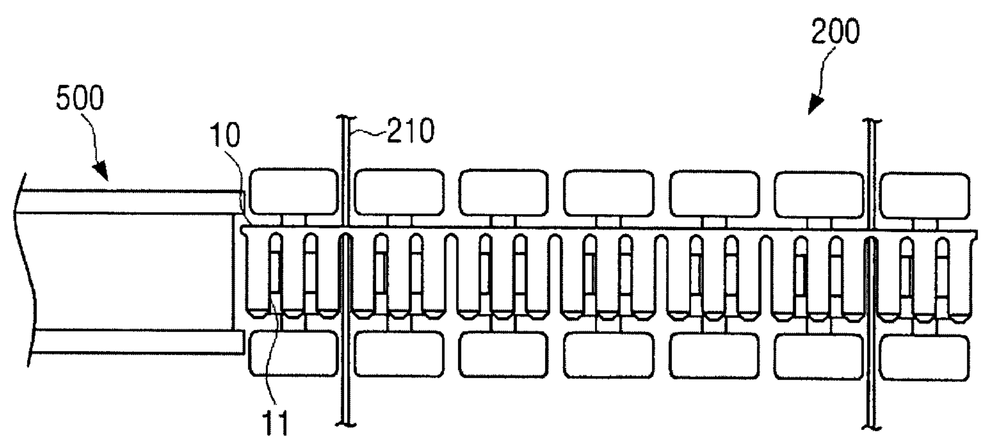
FIG. 4 is a view illustrating a figure in which the heat exchange fins illustrated in FIG. 3 are transferred by a transfer apparatus.

FIG. 3 is a view illustrating heat exchange fins according to an exemplary embodiment of the disclosure and FIG. 4 is a view illustrating a figure in which the heat exchange fins illustrated in FIG. 3 are transferred by a transfer apparatus. Referring to FIGS. 3 and 4, the heat exchange fins 10 may be machined so as to be arranged in a plurality of columns. The transfer apparatus 500 may be a conveyer belt or a roller. The plurality of heat exchange fins 10 may be seated on the conveyer belt or the roller to be transferred. The heat exchange fins 10 arranged in the plurality of columns are transferred to the integrating apparatus.

The heat exchange fins 10 may be divided into a plural number to be integrated. For example, a plurality of integrating apparatuses 200 may be installed. The heat exchange fins 10 of the odd-numbered columns transferred by the transfer apparatus 500 may be transferred to a first integrating apparatus 200, and the heat exchange fins 10 of the even-numbered columns may be transferred to a second integrating apparatus 201 (FIG. 1). That is, the heat exchange fins 10 of the odd-numbered columns may be branched into the first integrating apparatus 200 to be moved, and the heat exchange fins 10 of the even-numbered columns may be branched into the second integrating apparatus 201 to be moved.

The transfer apparatus 500 positioned to be adjacent to the integrating apparatus 200 may be provided in a form of roller. The plurality of heat exchange fins 10 may be transferred by the roller and may be transferred to the integrating apparatus 200. The first integrating apparatus 200 may include the integrating means 210, and the integrating means 210 may be installed at a lower portion of the roller which is adjacent to the first integrating apparatus 200. Although not shown, the heat exchange fins 10 of the even-numbered columns may be moved to the second integrating apparatus 201 to integrate the heat exchange fins 10 in the same structure as the first integrating apparatus 200.

The integrating means 210 may be a wire or a blade. The wire or the blade may be installed to be extended in a direction which is perpendicular to a direction in which the heat exchange fins 10 are transferred. A plurality of integrating means 210 may be disposed at the lower portion of the roller at a predetermined interval. In addition, the integrating means 210 is installed so as not to be interfered with the roller.

Figure 5:
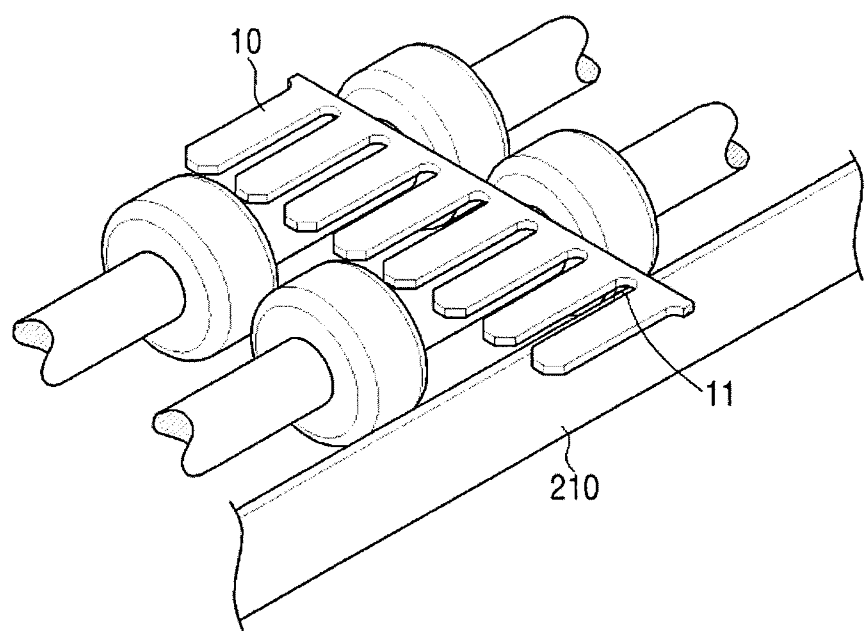
FIG. 5 is an enlarged perspective view of the transfer apparatus illustrated in FIG. 4.
Figure 6:
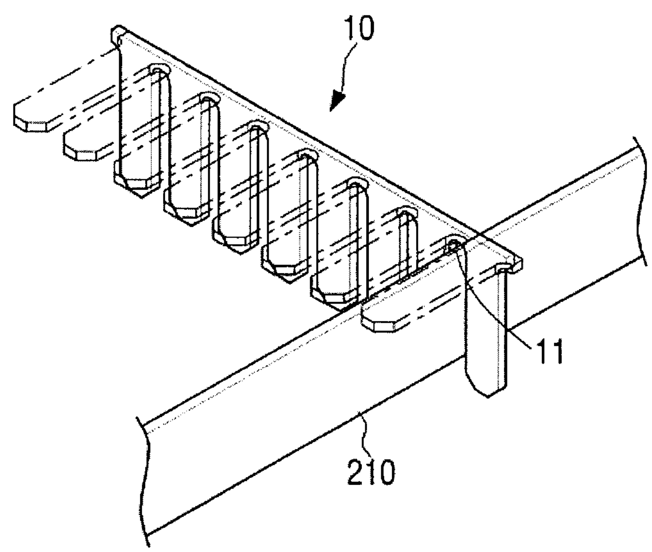
FIG. 6 is a view illustrating a figure in which the heat exchange fins illustrated in FIG. 5 are rotated to be aligned.

FIG. 5 is an enlarged perspective view of the transfer apparatus illustrated in FIG. 4 and FIG. 6 is a view illustrating a figure in which the heat exchange fins illustrated in FIG. 5 are rotated to be aligned. Referring to FIGS. 5 and 6, the integrating means 210 may upwardly rise at the point at which the transfer apparatus 500 is terminated. The integrating means 210 are disposed at positions corresponding to a plurality of insertion grooves 11 which are formed in the heat exchange fins 10. In the case in which the integrating means 210 upwardly rise, the heat exchange fins 10 may be seated on the integrating means 210 in a state in which the integrating means 210 are inserted into the insertion grooves 11 of the heat exchange fins 10, and the insertion grooves 11 are downwardly disposed.

As another example, the heat exchange fins 10 transferred by the transfer apparatus 500 may downwardly fall at the point at which the transfer apparatus 500 is terminated. The heat exchange fins 10 which downwardly fall may be seated on the integrating means 210. The heat exchange fins 10 which are horizontally seated on the transfer apparatus 500 to be transferred may be vertically seated on the integrating means 210.

The integrating means 210 are disposed at the positions corresponding to the insertion grooves 11 of the heat exchange fins 10. That is, the integrating means 210 may support the heat exchange fins 10 so that the integrating means 210 are inserted into the insertion grooves 11 of the heat exchange fins 10 and the insertion grooves 11 are downwardly directed.

Figure 7:
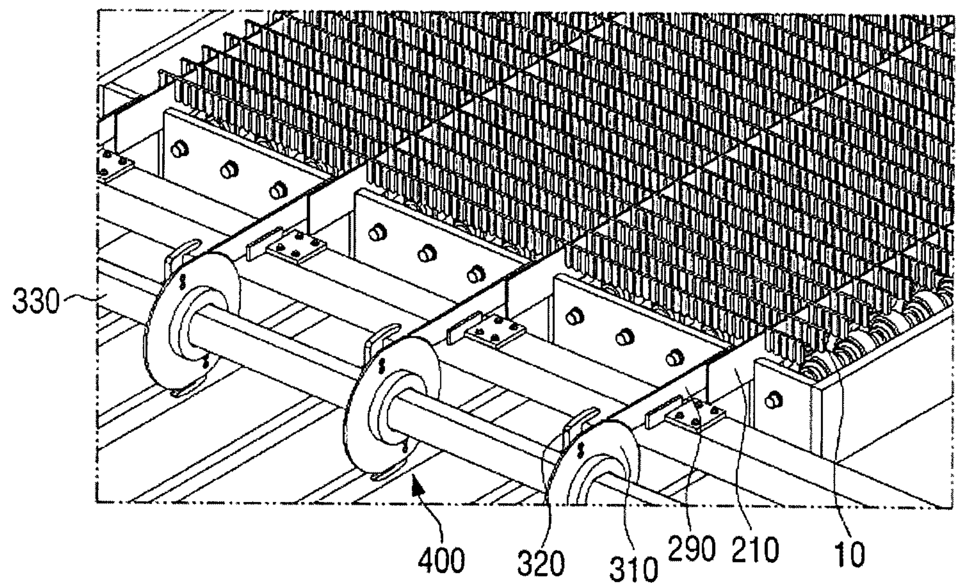
FIG. 7 is a view illustrating a state in which a reversing apparatus and the heat exchange fins according to an exemplary embodiment of the disclosure are aligned.
Figure 8:
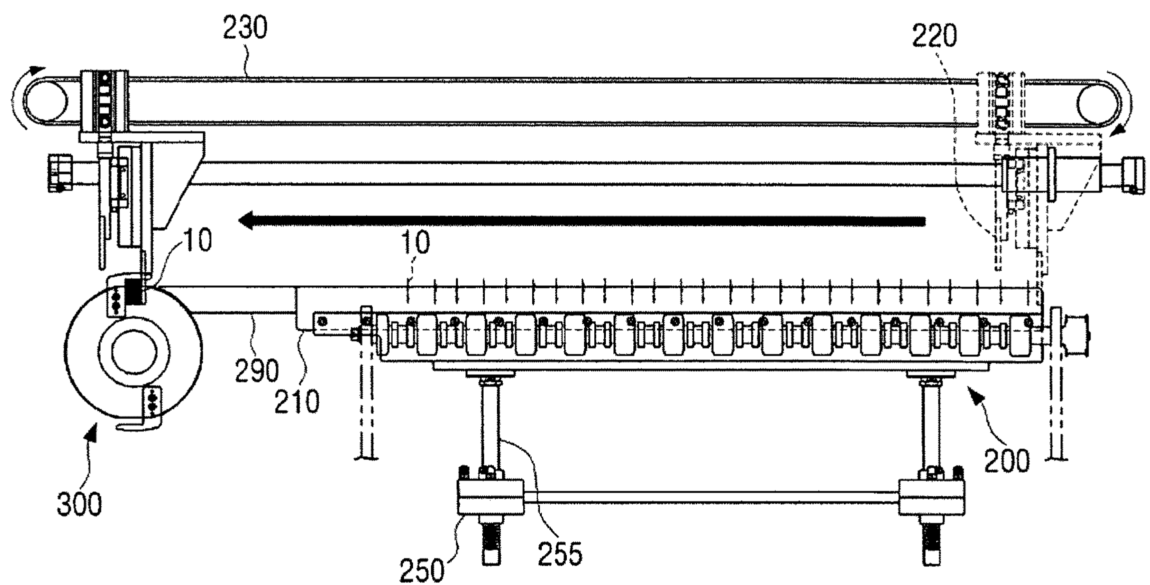
FIG. 8 is a view illustrating a process in which the heat exchange fins are transferred toward the reversing apparatus illustrated in FIG. 7.

FIG. 7 is a view illustrating a state in which a reversing apparatus and the heat exchange fins according to an exemplary embodiment of the disclosure are aligned and FIG. 8 is a view illustrating a process in which the heat exchange fins are transferred toward the reversing apparatus illustrated in FIG. 7. Referring to FIGS. 7 and 8, the insertion grooves 11 of the heat exchange fins 10 are inserted with the integrating means 210. That is, by the integrating means 210, the heat exchange fins 10 stand in a vertical direction and the insertion grooves 11 of the heat exchange fins 10 are positioned to be downwardly directed.

The integrating means 210 may be elevated by an elevating member 250 disposed at a lower portion thereof. An elevating shaft 255 may be connected to the lower portion of the integrating means 210, and the elevating member 250 may be elevated by rotating and driving the elevating shaft 255. For example, the elevating shaft 255 may be a screw shaft, and the elevating member 250 may be a motor connected to the screw shaft.

The heat exchange fins 10 aligned by the integrating means 210 may be transferred by the collector 220 and may be integrated to be in contact with each other. The collector 220 may be moved by a belt 230 positioned at an upper portion of the integrating means 210. The belt 230 may be extended along a movement direction of the heat exchange fins 10. If the belt 230 is rotated, the collector 220 mounted in the belt 230 may push the heat exchange fins 10 to allow the plurality of heat exchange fins 10 to be collected and integrated with each other. Meanwhile, the transfer of the collector 220 is not limited to the belt 230, but a driving cylinder or a driving motor capable of applying driving force to the collector 220 may be used.

The heat exchange fins 10 are integrated by the collector 220 and are transferred along the integrating means 210. In order for the collector 220 to avoid interference with the integrating means 210, a guide groove 222 (FIG. 2) may be formed in a lower surface of the collector 220. Therefore, the collector 220 may be in contact with the heat exchange fins 10, and the integrating means 210 may easily transfer the heat exchange fins 10 through the guide groove 222.

A guide plate 290 may be installed at the front of the integrating means 210 in relation to the transfer direction of the heat exchange fins 10. The guide plate 290 is disposed at a position corresponding to the integrating means 210, and is installed on one straight line so as to extend the integrating means 210. The reversing apparatus 300 is installed at the front of the guide plate 290 in relation to the transfer direction of the heat exchange fins 10. The heat exchange fins 10 are transferred to the reversing apparatus 300 along the integrating means 210 and the guide plate 290 by the collector 220.

Figure 9:
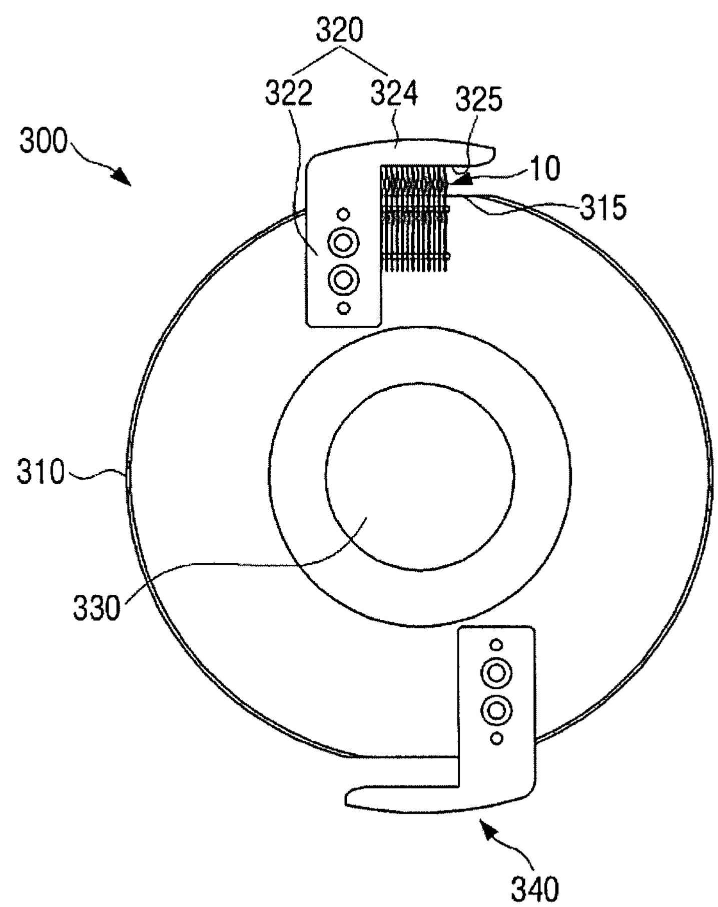
FIGS. 9 and 10 are views illustrating an operation process of the reversing apparatus illustrated in FIG. 8.
Figure 10:
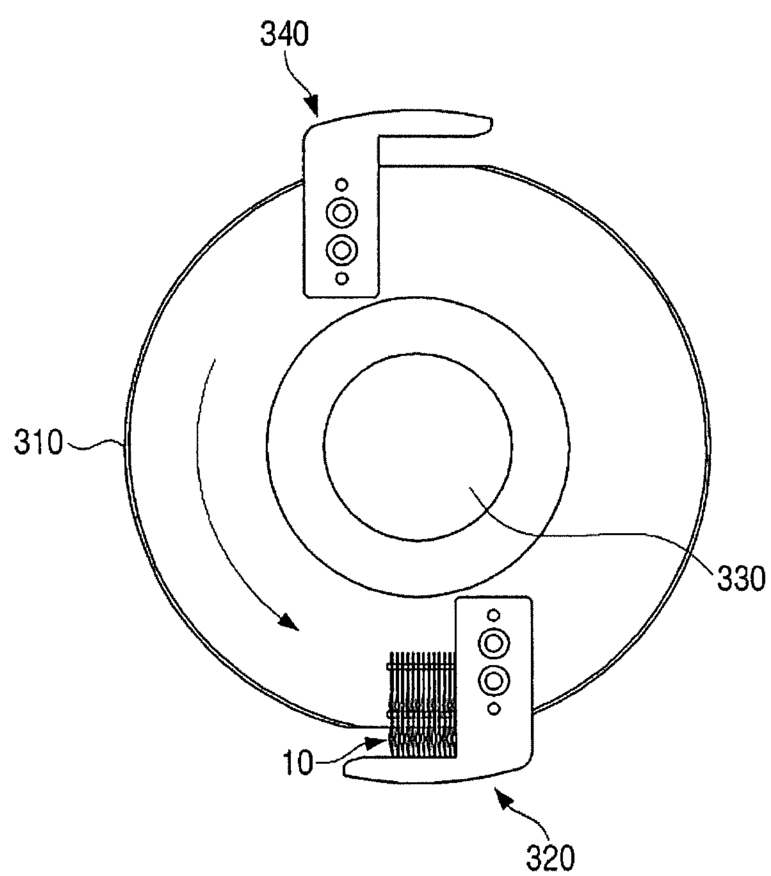

FIGS. 9 and 10 are views illustrating an operation process of the reversing apparatus illustrated in FIG. 8. Referring to FIGS. 9 and 10, the reversing apparatus 300 may include a rotating body 310 and a rotating blade 320. The rotating body 310 is disposed at one side of the transferred heat exchange fins 10. The rotating blade 320 may be connected to one side of the rotating body 310 to be rotated together with the rotating body 310.

For example, the rotating body 310 may have a through-hole (not shown) formed at the center thereof, and a rotating shaft 330 may be inserted into the through-hole. A driving member (not shown) may be connected to one side of the rotating shaft 330 to rotatably drive the rotating shaft 330. The driving member may be a driving motor. Meanwhile, a plurality of rotating bodies 310 may be disposed to be spaced apart from each other by a preset interval along a length direction of the heat exchange fins 10.

The rotating body 310 may have a circular disc shape. A seating surface 315 may be formed on an outer peripheral surface of the rotating body 310. The seating surface 315 may be disposed to be parallel to the transfer direction of the heat exchange fins 10 and may be inserted into the insertion grooves 11 of the transferred heat exchange fins 10. That is, the rotating body 310 has a thickness which corresponds to or is smaller than the insertion groove 11.

The rotating blade 320 is connected to the seating surface 315 to be rotated together with the rotating body 310. The rotating blade 320 supports an upper end of the heat exchange fins 10 in a state in which the heat exchange fins 10 are seated on the seating surface 315 to prevent the heat exchange fins 10 from being deviated from the rotating body 310. In the case in which the rotating body 310 is rotated, the rotating blade 320 may have a height corresponding to the upper end of the heat exchange fins 10 so that the heat exchange fins 10 are stably reversed, thereby making it possible to support the heat exchange fins 10.

The rotating blade 320 may have a vertical blade part 322 and a horizontal blade part 324. The vertical blade part 322 may protrude from an upper portion of the seating surface 315, and may be disposed at a front portion of the seating surface 315 in relation to the transfer direction of the heat exchange fins 10. The horizontal blade part 324 is connected to an upper end portion of the vertical blade part 322, and protrudes toward a rear portion of the seating surface 315.

The rotating blade 320 has a support surface 325, and the support surface 325 is disposed to be opposite to the seating surface 315. The support surface 325 may be disposed to be parallel to the seating surface 315. That is, one surface and the other surface of the heat exchange fins 10 are each supported between the seating surface 315 and the support surface 325, such that the heat exchange fins 10 are rotated in a state in which the heat exchange fins 10 are fixed to the rotating blade 320 and the rotating body 310, respectively.

A plurality of rotating blades 320 may be provided. For example, a first rotating blade 320 may be disposed at one side of an outer surface of the rotating body 310, and a second rotating blade 340 may be disposed at an opposite side of the first rotating blade 320. In this case, the seating surface 315 may be formed to correspond to the first and second rotating blades 320 and 340.

In the case in which the heat exchange fins 10 are reversed by rotating the rotating shaft 330 by 180°, the heat exchange fins 10 may be sequentially reversed by the first and second rotating blades 320 and 340. Although not shown, a controller may be connected to the driving member. The controller may change the rotating blade 320 to a standby position (see FIG. 9) in which the heat exchange fins 10 are placed on the seating surface 315 and an operation position (see FIG. 10) at which the rotating blade 320 is rotated together with the rotating body 310 and the insertion grooves 11 are disposed to be upwardly directed.

Figure 11:
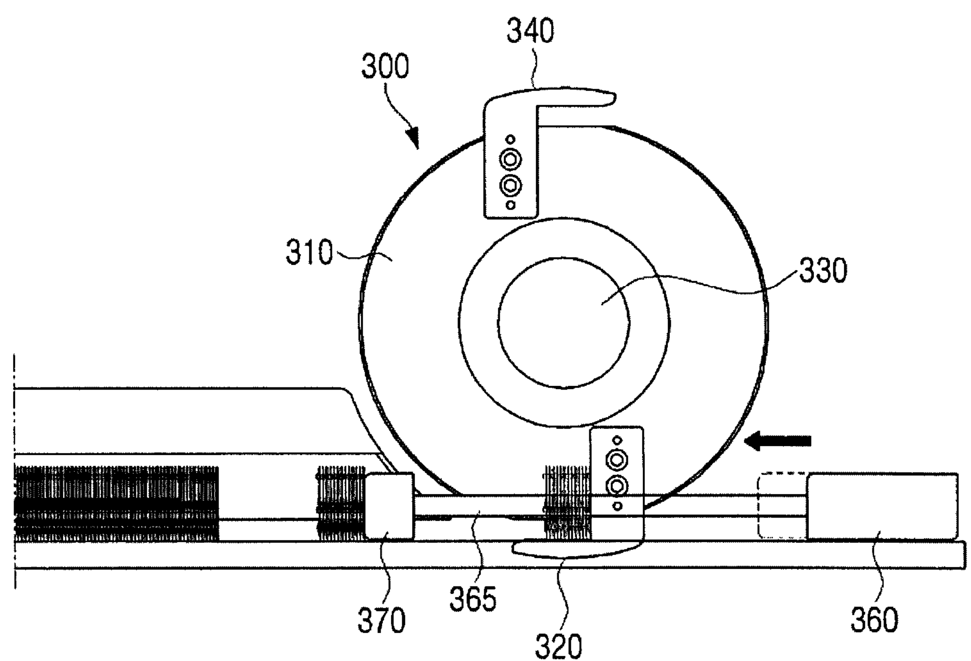
FIG. 11 is a view illustrating a process of integrating reversed heat exchange fins illustrated in FIG. 10.

FIG. 11 is a view illustrating a process of integrating the reversed heat exchange fins illustrated in FIG. 10. Referring to FIG. 11, a pushing plate 370 is installed at a lower portion of the rotating shaft 330. The pushing plate 370 may transfer the heat exchange fins 10 in the state in which the heat exchange fins 10 are reversed. The pushing plate 370 may be connected to the driving member 360 to be moved by driving force of the driving member 360.

As an example, the driving member 360 may be a driving cylinder. The pushing plate 370 may be connected to a front end portion of a piston rod 365 to be moved. A plurality of pushing plates 370 may be each disposed at both sides of the rotating body 310 to transfer the reversed heat exchange fins 10 without interfering with the rotating body 310. Meanwhile, the pushing plate 370 may be connected to the screw shaft to be moved forward and backward by the driving motor which rotatably drives the screw shaft.

Figure 12:
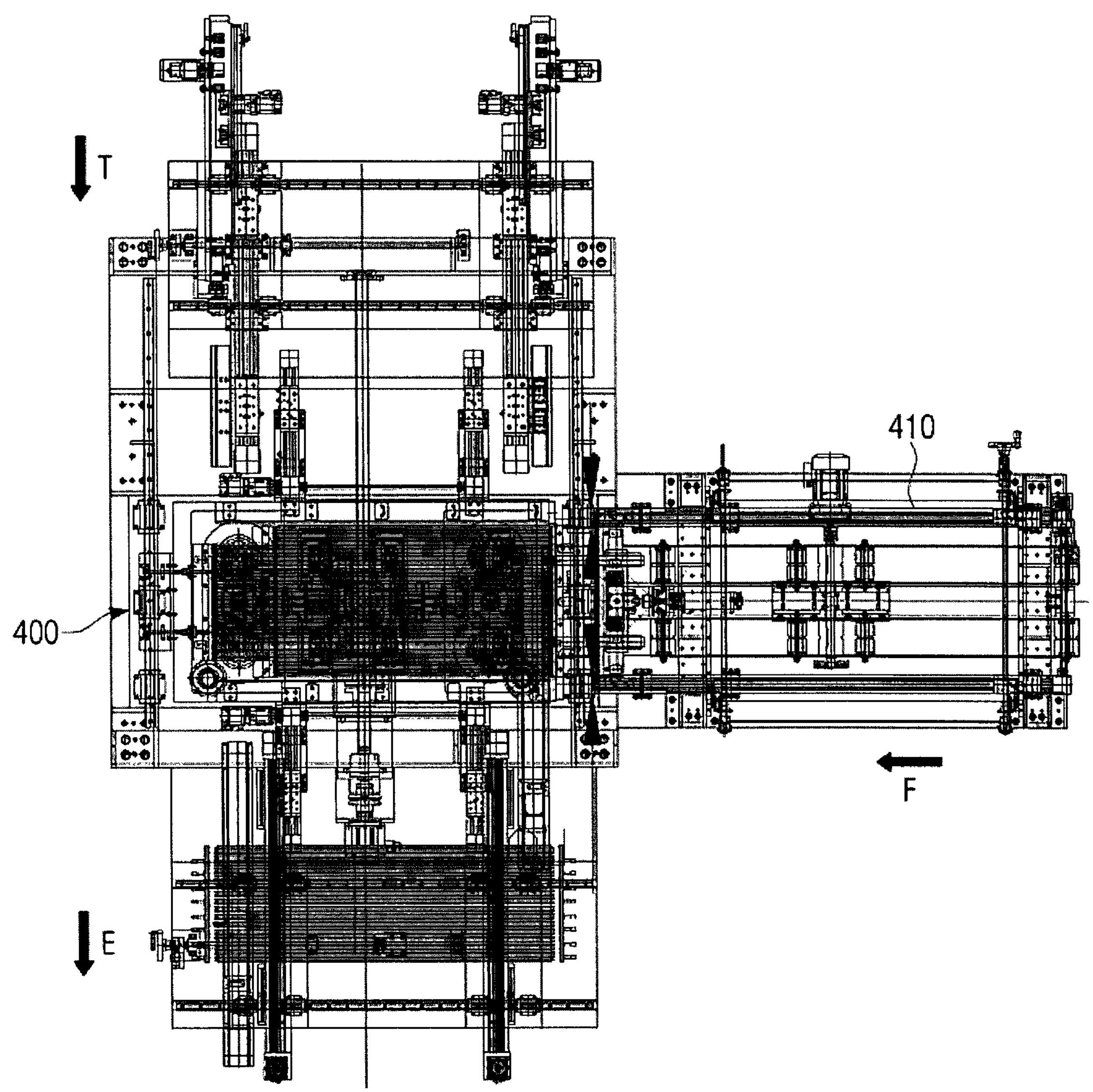
FIG. 12 is a plan view of a pressing apparatus illustrated in FIG. 1.
Figure 13:
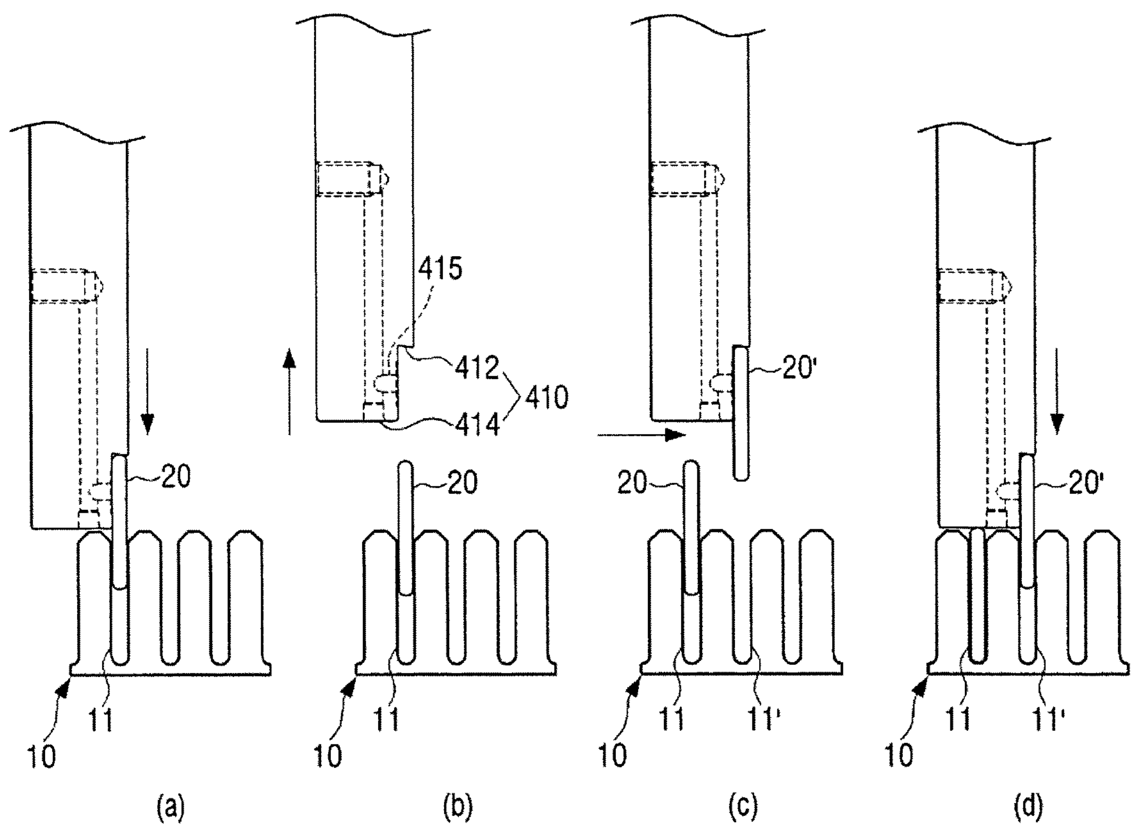
FIG. 13 includes views (a)-(d) illustrating an operation process of a pressing block illustrated in FIG. 1.

FIG. 12 is a plan view of a pressing apparatus illustrated in FIG. 1 and FIG. 13 includes views (a)-(d) illustrating an operation process of a pressing block illustrated in FIG. 1. Referring to FIGS. 12 and 13, the heat exchange fins 10 integrated in a state in which the insertion grooves 11 are placed to be upwardly directed by the reversing apparatus 300 may be transferred to a pressing apparatus 400. For example, the heat exchange fins 10 may be seated on the belt 410 to be transferred (F direction) to the pressing apparatus 400 by a rotation of the belt 410.

Further, although not shown, the heat exchange fins 10 integrated to a preset amount (or thickness) by the pushing plate 370 may further include a separating apparatus which separates the heat exchange fins 10 into the number which may be pressed into the refrigerant tube 20 at one time. The separating apparatus may be provided in a blade form.

The separating apparatus may be moved by the belt similarly to the collector 220, and may partition the heat exchange fins 10 pressed into the pressing apparatus 400 into the number which may be pressed into the refrigerant tube 20 at one time. A collection of the plurality of heat exchange fins 10 obtained by partitioning the heat exchange fins 10 by the separating apparatus may be referred to as a heat exchange fin unit. That is, the plurality of heat exchange fins 10 may be partitioned into heat exchange fin units by the separating apparatus. One heat exchange fin unit may be simultaneously pressed into the refrigerant tube 20.

The pressing apparatus 400 may support and transfer a plurality of arranged refrigerant tubes 20, and may include a pressing block 410 that presses the refrigerant tube 20 into the insertion groove 11 of the heat exchange fins 10. The pressing block 410 may be disposed at one side of the refrigerant tube 20 and adsorb one refrigerant tube 20 to be pressed in the insertion groove 11 of the heat exchange fins 10.

As an example, the pressing block 410 may be disposed over the heat exchange fins 10 and may be elevated toward the heat exchange fins 10. In addition, the pressing block 410 may be moved along the length direction of the heat exchange fins 10. For example, one side of the pressing block 410 is connected to the piston rod, such that the pressing block may be elevated by pressurization of the cylinder. In addition, the screw shaft is connected to the other side of the pressing block 410, such that the pressing block 410 may be moved along the length direction of the heat exchange fins 10 by the motor that rotatably drives the screw shaft. Meanwhile, a principle in which the pressing block 410 is elevated and moved is not limited thereto.

The heat exchange fins 10 may be transferred (F) from one side of the pressing block 410, and the refrigerant tube 20 may be transferred (T) from a rear of the pressing apparatus 400. The refrigerant tube 20 may be mounted in the pressing apparatus 400 to be moved together with the pressing apparatus 400.

The pressing block 410 may have a first block part 412 and a second block part 414. The first block part 412 and the second block part 414 are formed to be stepped from each other. A lower end of the first block part 412 is spaced apart from the upper end of the heat exchange fins 10. The second block part 414 may be connected to the first block part 412, and may be disposed to protrude along the length direction of the heat exchange fins 10. A lower end of the second block part 414 protrudes to be lower than the lower end of the first block part 412 and is disposed to be adjacent to the heat exchange fins 10.

For example, the lower end of the first block part 412 and the lower end of the second block part 414 may have an interval of 20% to 50% of the height of the refrigerant tube 20. That is, in the case in which the first block part 412 falls, the refrigerant tube 20 is primarily pressed into 20% to 50% of the insertion groove 11. Next, in the case in which the second block part 414 falls, the refrigerant tube 20 is fully inserted into the insertion groove 11. Hereinafter, the operation process of the pressing block 410 will be described in detail.

The heat exchange fins 10 are transferred to the lower portion of the pressing block 410 in the state in which the insertion grooves 11 of the heat exchange fins 10 are upwardly reversed. In order to press the refrigerant tube 20 into the insertion groove 11, the refrigerant tube 20 may maintain a state in which the refrigerant tube 20 stands at a position corresponding to the insertion groove 11 by suction. The pressing block 410 may be connected to an inhale means (not shown) that may perform the suction, and may adsorb and fix one refrigerant tube 20 through an inhale hole 415 formed in the pressing block 410.

The first block part 412 is positioned over the insertion groove 11 in the state in which the refrigerant tube 20 is fixed by the suction, and the refrigerant tube 20 is pressed into the insertion groove 11 by falling the first block part 412 (a first pressing state (FIG. 13 (*a*)). The lower end of the first block part 412 may be disposed to be higher than the lower end of the second block part 414, and the first block part 412 and the second block part 414 may have the interval of 20% to 50% of the height of the refrigerant tube 20.

That is, by falling the first block part 412, the refrigerant tube 20 is pressed into a depth of 20% to 50% of the insertion groove 11. In this case, the pressing block 410 falls so that the lower end of the second block part 414 is disposed to be adjacent to the upper end of the heat exchange fins 10.

In the state in which the refrigerant tube 20 is primarily pressed into the insertion groove 11, after the pressing block 410 raises (FIG. 13(*b*)), the second block part 414 is transferred to be positioned over the refrigerant tube 20 (FIG. 13(*c*)). Here, a state in which another refrigerant tube 20' is fixed to the first block part 412 by the suction is maintained.

Next, if the pressing block 410 again falls at a preset pitch, the second block part 414 pressurizes the refrigerant tube 10 to thereby fully insert the refrigerant tube 20 into the insertion groove 11 so that the lower end of the refrigerant tube 20 is in contact with a bottom surface of the insertion groove 11 (FIG. 13(*d*)). Simultaneously, the first block part 412 presses the refrigerant tube 20' fixed by the suction into another insertion groove 11'. That is, the pressing block 410 may primarily press the refrigerant tube 20' into a neighboring insertion groove 11' by once falling, and may secondarily press the primarily pressed refrigerant tube 20.

In this case, the refrigerant tube 20 is fully pressed into the insertion groove 11 which is positioned at a first point, and the refrigerant tube 20' is pressed into the insertion groove 11' which is positioned at a second point at the depth of 20 to 50% of the insertion groove 11'. The first block part 412 and the second block part 414 may have lower surfaces corresponding to an upper surface of the refrigerant tube 20 so as to easily press the refrigerant tube 20.

In addition, a plurality of pressing blocks 410 may be disposed along the length direction of the heat exchange fins

10. That is, the pressing apparatus 400 may selectively press a single or a plurality of refrigerant tubes 20 into the insertion groove 11, and may arbitrarily perform the pressing according to an arrangement.

As well, the pressing block 410 may have a width smaller than protruding parts of both sides of the insertion groove 11 in relation to the insertion groove 11 of the heat exchange fins 11. In this case, the refrigerant tube 20 may be sequentially pressed into the insertion groove 11, and the pressing block 410 has an advantage that it may perform a pressing operation in a state without interfering with the inserted refrigerant tube 20.

Further, the pressing apparatus 400 may insert the refrigerant tube 20 into the entirety of insertion grooves 11, or may selectively insert the refrigerant tube 20 into only the preset insertion grooves 11 by adjusting a movement interval of the pressing block 410. Meanwhile, a pressing interval of the refrigerant tube 20 may also be adjusted by moving the heat exchange fins 10 positioned below the pressing block 410.

When it is completed that the refrigerant tube 20 is pressed into the insertion groove 11 of the heat exchange fins 10, the heat exchange fins 10 are discharged (E) to the front of the pressing apparatus 400 to be coupled to a header 41, 42 to be described below, thereby making it possible to manufacture the heat exchanger 1.

That is, the pressing block 410 according to an exemplary embodiment of the disclosure may minimize a problem that the heat exchange fins 10 are dented or damaged by sequentially pressing the refrigerant tube 20 using the first block part 412 and the second block part 414. Further, a large pressing facility is required to press the refrigerant tube 20 in the case in which the refrigerant tube 20 is inserted into the insertion groove 11 in the state in which the insertion groove 11 is disposed to be downwardly directed according to the related art, but according to the disclosure, there is an advantage that the heat exchanger 1 may be produced in a small size regardless of a size of a product.

Figure 14:
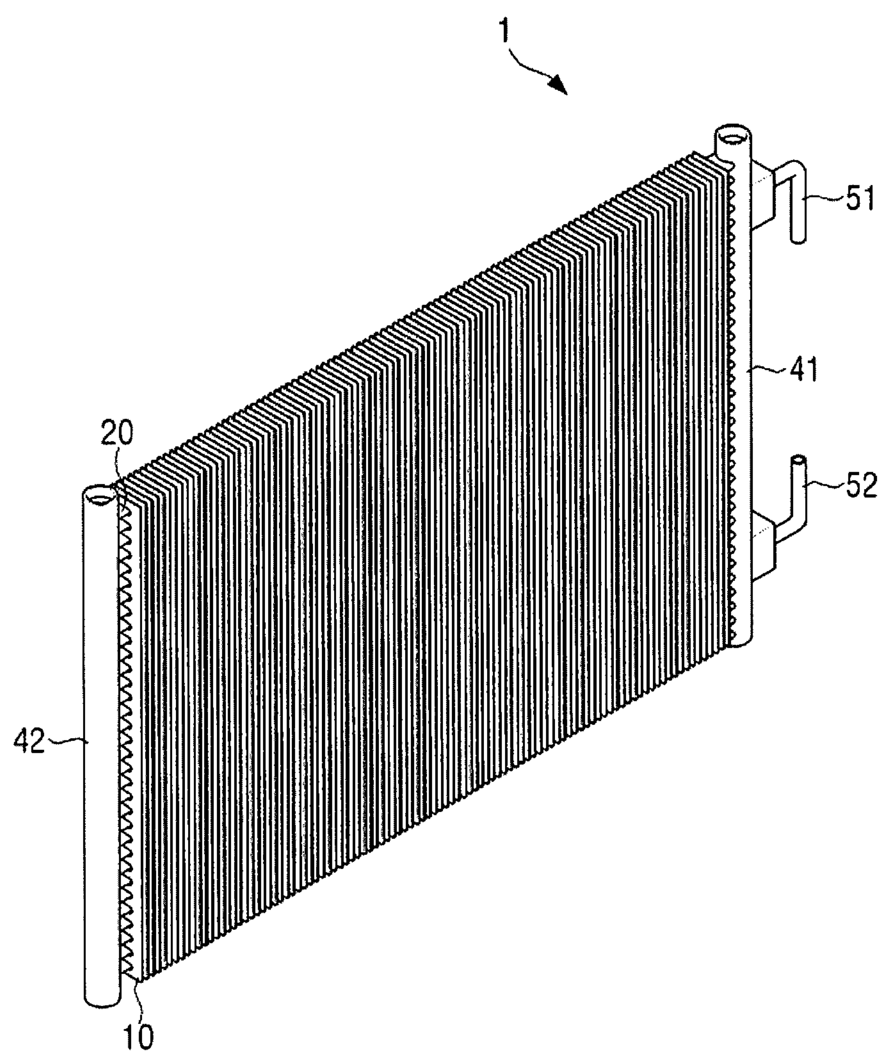
FIG. 14 is a view illustrating a heat exchanger manufactured by the apparatus for manufacturing a heat exchanger illustrated in FIG. 1.

FIG. 14 is a view illustrating a heat exchanger manufactured by the apparatus for manufacturing a heat exchanger illustrated in FIG. 1. Referring to FIG. 14, the heat exchanger includes a refrigerant tube and a plurality of heat exchange fins. As described above, the plurality of heat exchange fins 10 are coupled to the plurality of refrigerant tubes 20. Headers 41 and 42 are provided to both ends of the plurality of refrigerant tubes 20.

The refrigerant tube 20 may be provided in a flat plate form. The refrigerant tube 20 may include a plurality of channels in which a refrigerant may flow, and the plurality of channels are partitioned by partitions. The plurality of refrigerant tubes 20 may be stacked in a vertical direction while being spaced apart from each other by a predetermined interval. In this case, the plurality of channels may be extended in a width direction of the refrigerant tube 20.

The refrigerant performs a heat exchange with external air while being phase-changed (compression) from a gas state to a liquid state, or performs the heat exchange with the external air while being phase-changed (expansion) from the liquid state to the gas state. When the refrigerant performs the phase-change from the gas state to the liquid state, the heat exchanger may be used as a condenser, and when the refrigerant performs the phase-change from the liquid state to the gas state, the heat exchanger may be used as an evaporator.

The headers 41 and 42 include a first header 41 and a second header 42. The first header 41 and the second header 42 are coupled to both ends of the plurality of refrigerant tubes 20, respectively, to communicate between the plurality of refrigerant tubes 20. Since the first header 41 and the second header 42 are coupled to both ends of the plurality of refrigerant tubes 20, the plurality of refrigerant tubes 20 may be in communicate with therebetween to allow the refrigerant to flow between the plurality of refrigerant tubes 20.

The first and second headers 41 and 42 are provided in a hollow pipe form. A coupling slot may be provided so that an end portion of the refrigerant tube 20 is coupled to one side of each of the headers 41 and 42. In order to guide a flow of the refrigerant which sequentially passes through the refrigerant tubes 20, an internal space of each of the headers 41 and 42 may be partitioned into a plurality of spaces along a vertical length direction so as to correspond to the number of refrigerant tubes.

The first header 41 may be connected to a refrigerant inlet pipe 51 and a refrigerant output pipe 52 for guiding the refrigerant introduced into the heat exchanger 1 and the refrigerant discharged via the heat exchanger 1. The refrigerant discharges heat to the surrounding or absorbs heat from the surrounding by performing compression or expansion while flowing along the channels formed in the refrigerant tube 20. In order to efficiently discharge or absorb the heat at the time of the compression or the expansion of the refrigerant, the heat exchange fins 10 are coupled to the refrigerant tube 20.

The heat exchange fins 10 may be disposed to be extended in a length direction in which the refrigerant tubes are stacked. That is, if the refrigerant tubes 20 are stacked in a vertical direction, the heat exchange fins 10 may be disposed to be extended in the vertical direction so as to intersect with the refrigerant tubes 20. A plurality of heat exchange fins 10 may be provided while being spaced apart from each other by a predetermined interval.

The heat exchange fins 10 as described above are bonded to an outer surface of the refrigerant tube 20 to serve to increase a heat exchange area of external air passing between the heat exchange fins 10 and the refrigerant tube 20. In addition, the heat exchange fins 10 may also serve to guide a condensate water occurring from a surface of the refrigerant tube 20 so as to downwardly flow.

Hereinabove, although various exemplary embodiments of the disclosure are separately described, each of the exemplary embodiments does not necessarily need to be solely implemented, but a configuration and an operation of each of the exemplary embodiments may also be implemented to be combined with one or more other exemplary embodiments.

Hereinabove, although the exemplary embodiments of the disclosure have been shown and described, it should be understood that the disclosure is not limited to the disclosed embodiments and may be variously changed without departing from the spirit and the scope of the disclosure. Therefore, the disclosure should be construed as including all the changes, equivalents, and substitutions included in the spirit and scope of the disclosure.

What is claimed is:

1. An apparatus for manufacturing a heat exchanger, the apparatus comprising:

- a rotating body configured to be disposed at one side of heat exchange fins having an insertion groove in a downwardly directed position, the rotating body being further configured to be rotatable and to seat an inner side of the insertion groove of the heat exchange fins on the rotating body; and
- a rotating blade configured to be connected to the rotating body to be rotatable together with the rotating body, and configured to support an other side of the heat exchange fins to prevent the heat exchange fins from being deviated from the rotating body.

2. The apparatus as claimed in claim 1, wherein the rotating body includes a seating surface disposed to be parallel to a transfer direction of the heat exchange fins and is configured to have the heat exchange fins placed thereon.

3. The apparatus as claimed in claim 2, wherein the rotating blade includes:

a vertical blade part protruding from an upper portion of the seating surface and disposed at a front portion of the seating surface in relation to the transfer direction of the heat exchange fins; and a horizontal blade part connected to the vertical blade part, and protruding toward a rear portion of the seating surface.

4. The apparatus as claimed in claim 3, wherein the horizontal blade part includes a supporting surface supporting the other side of the heat exchange fins and disposed to be parallel to the seating surface.

5. The apparatus as claimed in claim 2, wherein the rotating blade is changeable to:

a first position at which the heat exchange fins are placed on the seating surface; and a second position at which the insertion groove is disposed to be in an upwardly directed position by rotating the rotating blade together with the rotating body.

6. The apparatus as claimed in claim 1, wherein the rotating blade includes:

a first rotating blade connected to one side of an outer surface of the rotating body; and a second rotating blade connected to the outer surface of the rotating body and disposed at an opposite side of the first rotating blade.

7. The apparatus as claimed in claim 1, further comprising a rotating shaft configured to be inserted into a through-hole formed at a center of the rotating body, wherein the rotating shaft is rotated by 180° at a preset time.

8. The apparatus as claimed in claim 1, further comprising a rotating shaft configured to be inserted into a through-hole formed at a center of the rotating body, wherein a plurality of rotating bodies are disposed at a preset interval along a length direction of the rotating shaft.

9. The apparatus as claimed in claim 1, further comprising a pressing block configured to be disposed at one side of the rotating body and to press a refrigerant tube into the insertion groove in a state in which the heat exchange fins are reversed so that the insertion groove is in an upwardly directed position by a rotation of the rotating body.

10. The apparatus as claimed in claim 9, wherein the pressing block is disposed over the heat exchange fins to be elevated toward the heat exchange fins, and a lower end of the refrigerant tube is sequentially pressed into the insertion groove.

11. The apparatus as claimed in claim 9, wherein the pressing block includes:

a first block part of which a lower end is spaced apart from an upper end of the heat exchange fins; and a second block part connected to one side of the first block part, and having a lower end protruding to be lower than the first block part.

12. The apparatus as claimed in claim 11, wherein the pressing block is movable along a length direction of the heat exchange fins, and the refrigerant tube is pressed in a first pressing state in which the refrigerant tube is pressed into the insertion groove by a lowering of the first block part, and a second pressing state in which the refrigerant tube is pressed into the insertion groove by a lowering of the second block part.

13. The apparatus as claimed in claim 11, wherein a distance between a lower end of the first block part and a lower end of the second block part is 20% to 50% of a height of the refrigerant tube.

* * * * *